(12) United States Patent
McAllister et al.

(10) Patent No.: US 7,568,348 B2
(45) Date of Patent: Aug. 4, 2009

(54) NOZZLE ASSEMBLY FOR ROCKET AND RAMJET APPLICATIONS

(75) Inventors: Andrew C. McAllister, Manassas, VA (US); Daniel C. Dombrowski, Marshall, VA (US)

(73) Assignee: Aerojet-General Corporation, Sacramento, CA (US)

( * ) Notice: Subject to any disclaimer, the term of this patent is extended or adjusted under 35 U.S.C. 154(b) by 524 days.

(21) Appl. No.: 11/287,297

(22) Filed: Nov. 28, 2005

(65) Prior Publication Data

US 2007/0119151 A1    May 31, 2007

(51) Int. Cl.
    *F02K 1/00* (2006.01)
(52) U.S. Cl. ............................ 60/771; 60/770
(58) Field of Classification Search .............. 60/230, 60/228, 770, 771; 239/265.13, 265.19
    See application file for complete search history.

(56) References Cited

U.S. PATENT DOCUMENTS

| | | | |
|---|---|---|---|
| 2,964,905 A | | 12/1960 | Hewson et al. |
| 3,570,247 A | | 3/1971 | Denning et al. |
| 3,598,318 A | * | 8/1971 | Schiel .................. 239/265.13 |
| 3,807,662 A | | 4/1974 | Velasquez |
| 3,831,887 A | | 8/1974 | Fosness |
| 4,753,392 A | | 6/1988 | Thayer et al. |
| 4,760,960 A | | 8/1988 | Ward et al. |
| 4,836,451 A | * | 6/1989 | Herrick et al. ......... 239/265.27 |
| 5,000,386 A | * | 3/1991 | Lybarger ................ 239/265.39 |
| 5,050,803 A | | 9/1991 | Wakeman et al. |
| 5,092,525 A | | 3/1992 | Roach et al. |
| 5,690,280 A | | 11/1997 | Holowach et al. |
| 5,699,966 A | * | 12/1997 | Beverage ................ 239/265.19 |
| 5,941,065 A | * | 8/1999 | Lidstone et al. ................ 60/771 |
| 6,681,561 B2 | | 1/2004 | Weiland et al. |
| 2001/0010148 A1 | * | 8/2001 | Michel et al. ............... 60/226.1 |
| 2003/0070417 A1 | | 4/2003 | Plumpe, Jr. |
| 2003/0154720 A1 | | 8/2003 | Boehnlein et al. |

* cited by examiner

*Primary Examiner*—Michael Cuff
*Assistant Examiner*—Andrew Nguyen
(74) *Attorney, Agent, or Firm*—Nixon & Vanderhye, PC

(57) ABSTRACT

A nozzle assembly for thrust or thrust vector control of a rocket or ramjet, comprising an elongated nozzle housing and a pair of vane members mounted for pivotal movement within a central portion of the nozzle housing. The vane members extend vertically or transversely between the upper and lower portions of the nozzle housing near the forward portion thereof, and extend longitudinally in the nozzle housing from the forward end portion thereof to a point near the rear end portion thereof. The vane members are pivotable about axes disposed between the forward and rear ends thereof, and are movable between an open position wherein they are in substantially parallel relation and a closed position wherein their forward ends are in engagement with each other and their rear ends are in engagement with the adjacent inner surface of the nozzle housing. An operating mechanism is operatively connected to the vane members to move them simultaneously or individually between the open and closed positions for thrust control or thrust vector control.

10 Claims, 5 Drawing Sheets

NOZZLE ASSEMBLY FOR ROCKET AND RAMJET APPLICATIONS

BACKGROUND OF THE INVENTION

1. Field of the Invention

The present invention relates to a nozzle assembly for a rocket and/or ramjet which is constructed to effect large changes in the nozzle throat area with minimal actuation forces and component mass.

2. Description of Related Art

Many different types of constructions and techniques are in the prior art for controlling the throat area in a nozzle assembly for rocket and/or ramjet applications to effect thrust and thrust vectoring control. Illustrative examples of such constructions and techniques are set forth in the patents described hereinafter.

U.S. Pat. No. 3,570,247 discloses a jet nozzle having a center body provided with flaps 19 that are movable to divert the flow of gases for thrust-spoiling or thrust-reversing.

U.S. Pat. No. 4,753,392 discloses a gas turbine engine exhaust nozzle including a pair of spaced-apart converging flaps which are rotatable about their respective axes to block or unblock the outlet ports.

U.S. Pat. No. 4,760,960 discloses in FIGS. 1a and 1b a pair of pivotable flap assemblies 16, 18 in a gas turbine exhaust nozzle for the purpose of controlling thrust.

U.S. Pat. No. 5,050,803 discloses an actuation system for positioning the divergent flaps of a vectorable two-dimensional exhaust nozzle.

U.S. Pat. No. 5,092,525 discloses a gas turbine engine exhaust nozzle comprising converging flaps each being operably connected through an actuation mechanism, to respective doors which block respective reverse thrust outlets.

U.S. Pat. No. 5,690,280 discloses a jet aircraft nozzle having thrust reversing and thrust vectoring functions using two pairs of pivotable flaps.

U.S. Pat. No. 6,681,561 discloses an outlet device for a jet engine comprising two guide flaps 11 and 12 which are rotatable about a rotary axis extending substantially perpendicularly to the main flow direction, and at least one intermediate guide flap 14 which is provided between the two guide flaps 11 and 12, and which is rotatable about a rotary axis extending in parallel with the rotary axis of the guide flaps.

Although the constructions and techniques disclosed in the above-described patents have, in many cases, generally served their purpose, they are subject to one or more of the following disadvantages:

1. They are complicated in construction;
2. They are difficult and/or expensive to manufacture;
3. They are unreliable in operation;
4. The operating mechanisms are exposed to hot exhaust gases and thus are subject to deterioration;
5. They require large component mass and weight;
6. They require large forces to move the operating elements; and
7. They provide for only small throat area changes.

The new and improved nozzle assembly of the present invention is not subject to the above-described disadvantages and possesses significant advantages not found in the constructions and techniques disclosed in the prior art.

BRIEF SUMMARY OF THE INVENTION

The nozzle assembly of the present invention comprises a nozzle housing having pivotally mounted therein a pair of vane members that are generally parallel when in the open position and are disposed in the center portion of the nozzle housing. Each of the vane members extends transversely or vertically from a point near the lower portion of the nozzle housing to a point near the upper portion thereof. Also, each vane member extends longitudinally or horizontally from a point near the front end portion of the nozzle housing to a point near the rear end portion thereof.

The vane members are pivotally mounted on the nozzle housing for movement about substantially vertical or transverse axes in lateral directions toward and away from each other to vary the throat area of the nozzle housing and to effect thrust control of the rocket or ramjet on which the nozzle housing is mounted. The vane members may be moved similar distances simultaneously for thrust control or may be moved individually different distances for thrust vector control.

Preferably, the pivot point for each vane member is disposed between the forward and rear ends thereof so that the gases flowing through the nozzle housing can impart an opening or closing force bias on the vane members.

The vane members may be pivoted simultaneously or separately within the nozzle housing by any suitable operating mechanism that is preferably located on the exterior of the nozzle housing so that it is not exposed to hot gases flowing through the nozzle housing. As an illustrative example, the operating mechanism may be mechanical, electromechanical, hydraulic or squib-actuated.

The vane members preferably have a streamlined shape so as to minimize the obstruction to gas flow through the nozzle housing when the vane members are in the fully open, substantially parallel positions. The vane members may be constructed of any suitable high temperature-resistant material.

DETAILED DESCRIPTION

Figure 1:
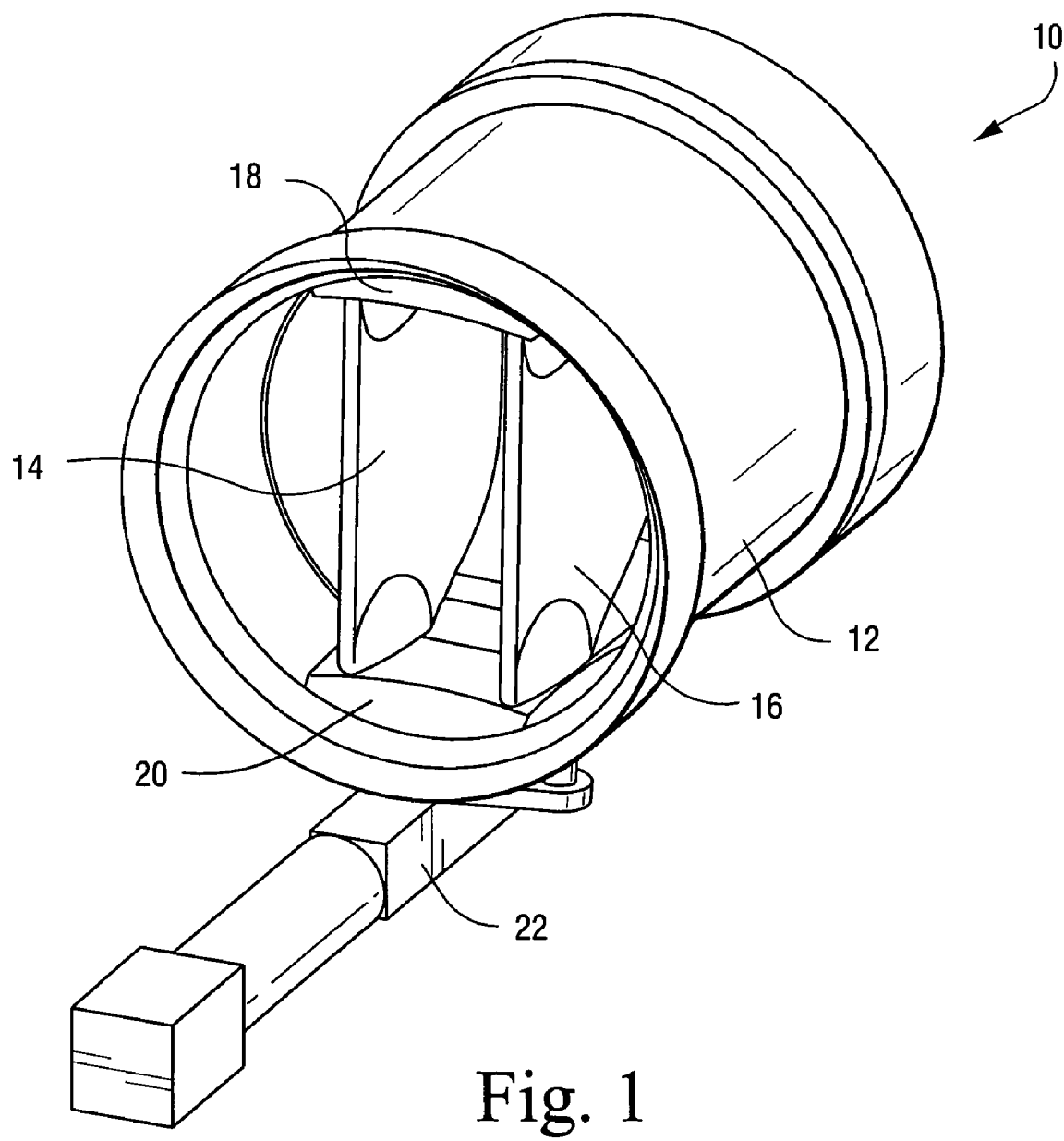
FIG. 1 is a perspective view of the front portion of a nozzle assembly constructed in accordance with the principles of the present invention.

As shown in FIG. 1, the nozzle assembly 10 of the present invention generally comprises a nozzle housing 12 that is constructed to be secured at its forward end in any suitable manner to the housing of a rocket, ramjet or the like (not shown). The nozzle housing 12 may be of any suitable shape, such as cylindrical, and may be made of any suitable high temperature-resistant material.

A pair of vane members 14,16 are pivotally mounted on the nozzle housing 12 and extend vertically or transversely between upper and lower platform portions 18, 20 on the nozzle housing 12. When in the fully open position shown in FIG. 1, the vane members 14, 16 extend in substantially parallel relation rearwardly or longitudinally through the nozzle housing 12.

An operating mechanism 22 of any suitable construction is connected in any suitable manner to the vane members 14, 16 to pivot them simultaneously or separately for varying the throat area of the nozzle housing 12 for thrust control or thrust vector control.

As shown more specifically in FIGS. 2-5, each vane member 14, 16 extends longitudinally or rearwardly from a point near the forward end portion of the nozzle housing 12 to a point near the rear end portion thereof. Each vane member is of a streamlined shape, such as that shown in FIGS. 2 and 3 wherein the forward and rear ends are narrow and the midportion is wider, so as to minimize the obstruction to gas flow through the nozzle member 12 when the vane members are in the fully open position shown in FIGS. 2 and 3, or other open positions.

Figure 3:
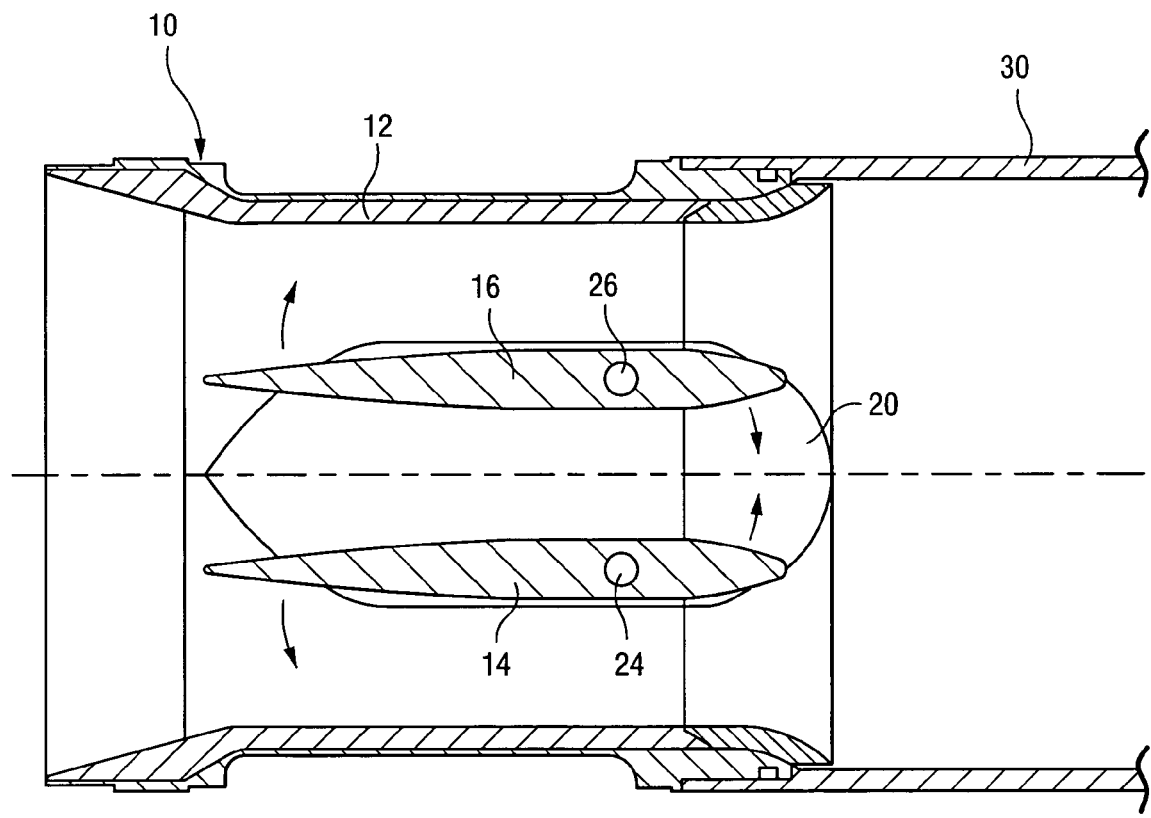
FIG. 3 is a sectional view taken substantially along line 3-3 in FIG. 2.
Figure 4:
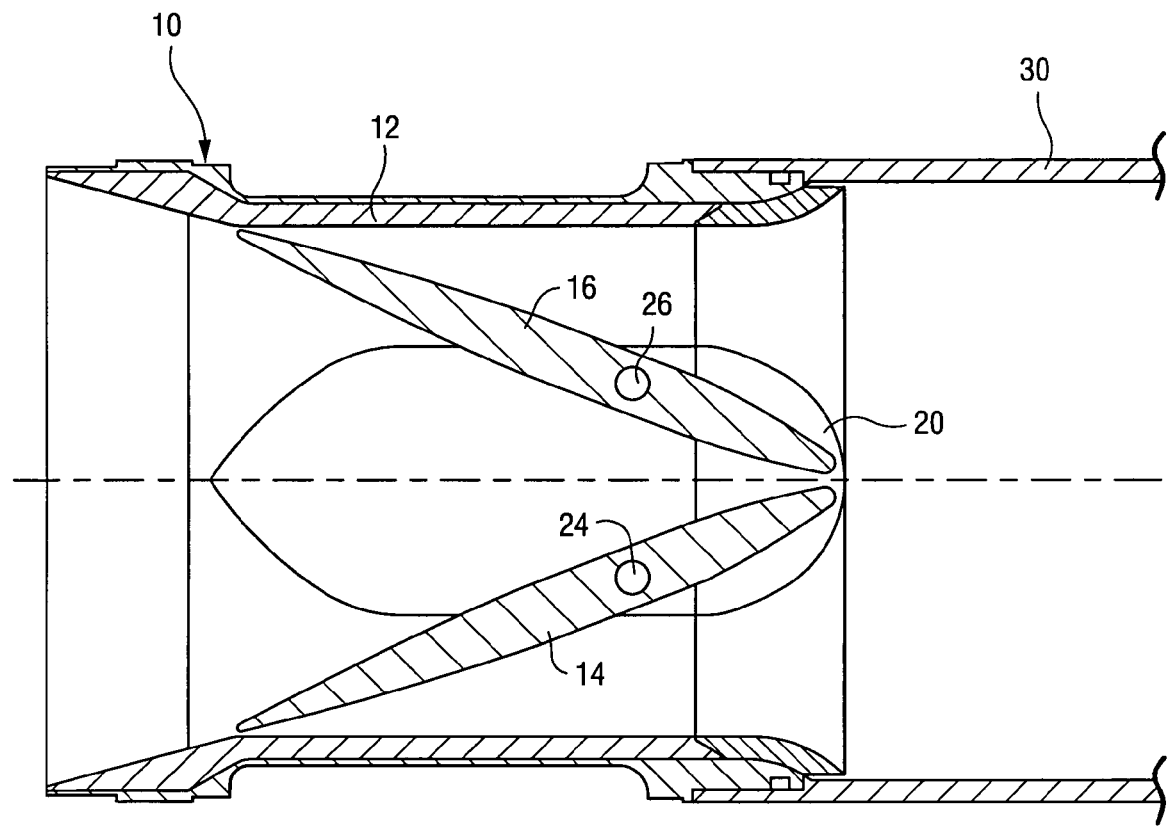
FIG. 4 is a view like FIG. 3 showing the vane members in a fully closed position.

The vane members 14, 16 are pivotally movable between the fully open position shown in FIG. 3 and, in the direction of the arrows (FIG. 3), the fully closed position shown in FIG. 4. Each vane member is connected to the nozzle housing 12 by a pivot pin 24, 26 which preferably is positioned between the forward and rear end portions of the vane member so that the gas flow through the nozzle housing 12 can impart an opening or closing force bias on the vane member to minimize the actuation force required to move the vane member toward an open or closed position. The pivot points for the vane members may be adjusted about the center of pressure within the nozzle housing 12 depending on predetermined operation and design goals for the vane members and the nozzle assembly.

Figure 5:
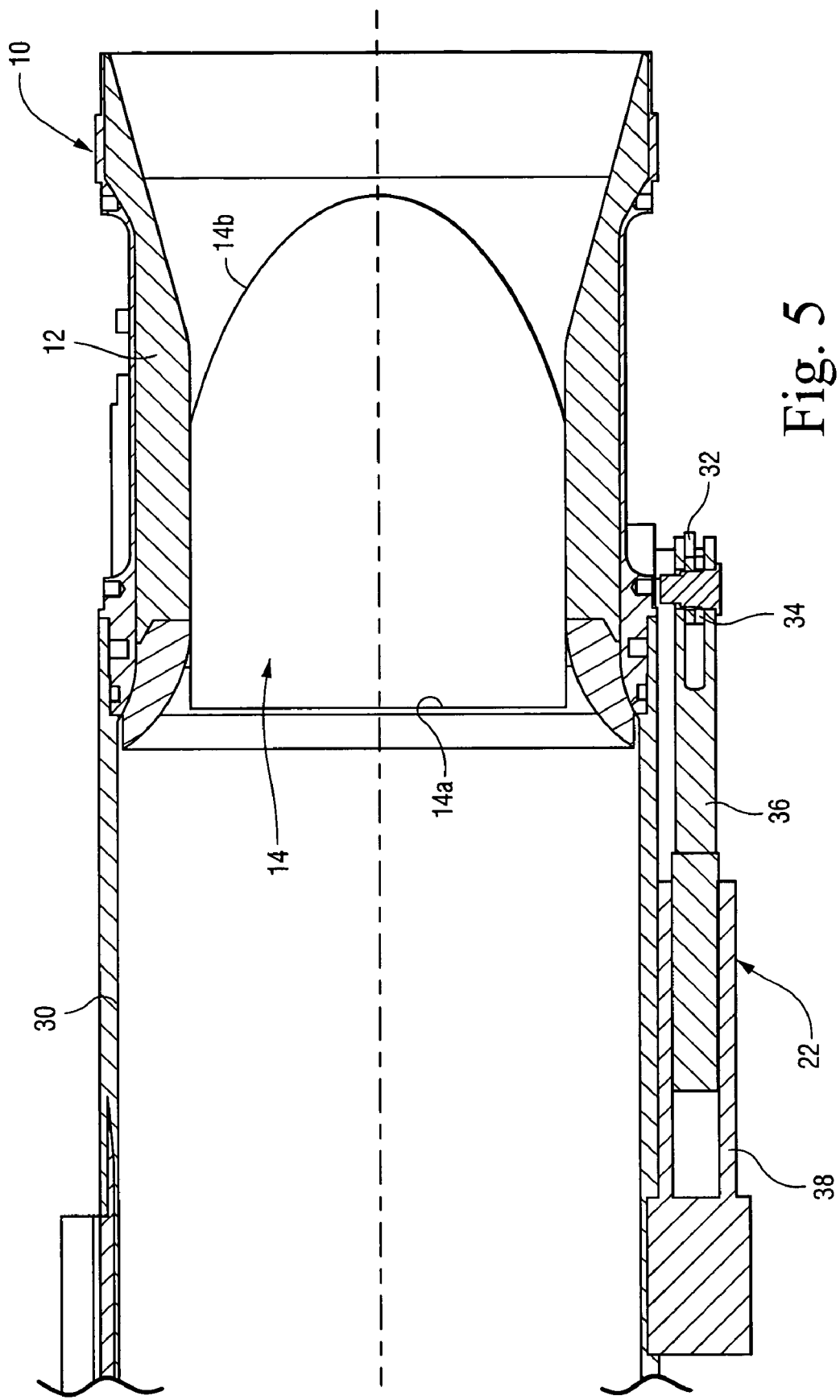
FIG. 5 is a sectional view taken substantially along line 5-5 in FIG. 2.

As shown in FIG. 5, the forward end 14a of the vane member 14 is substantially straight in a vertical or transverse direction, and the rear end 14b thereof is curved so as to engage in a substantially uniform manner the adjacent inner curved surface of the nozzle housing 12 when in the closed position shown in FIG. 4. The shape of the vane member 16 preferably is the same as that of the vane member 14.

The operating mechanism 22 for rotating the vane members 14, 16 may be connected to the pivot pins 24, 26 in any suitable manner for moving the vane members simultaneously or individually between the fully open and fully closed positions thereof shown in FIGS. 3 and 4, respectively.

The operating mechanism 22 preferably is located on the exterior of the nozzle housing 12 and the rear portion of a rocket or ramjet housing 30 (FIGS. 3-5) to which the nozzle housing 12 can be connected in any suitable manner. In this manner, the operating mechanism 22 is shielded from the hot exhaust gases passing through the rocket or ramjet housing 30 and the nozzle housing 12.

Figure 2:
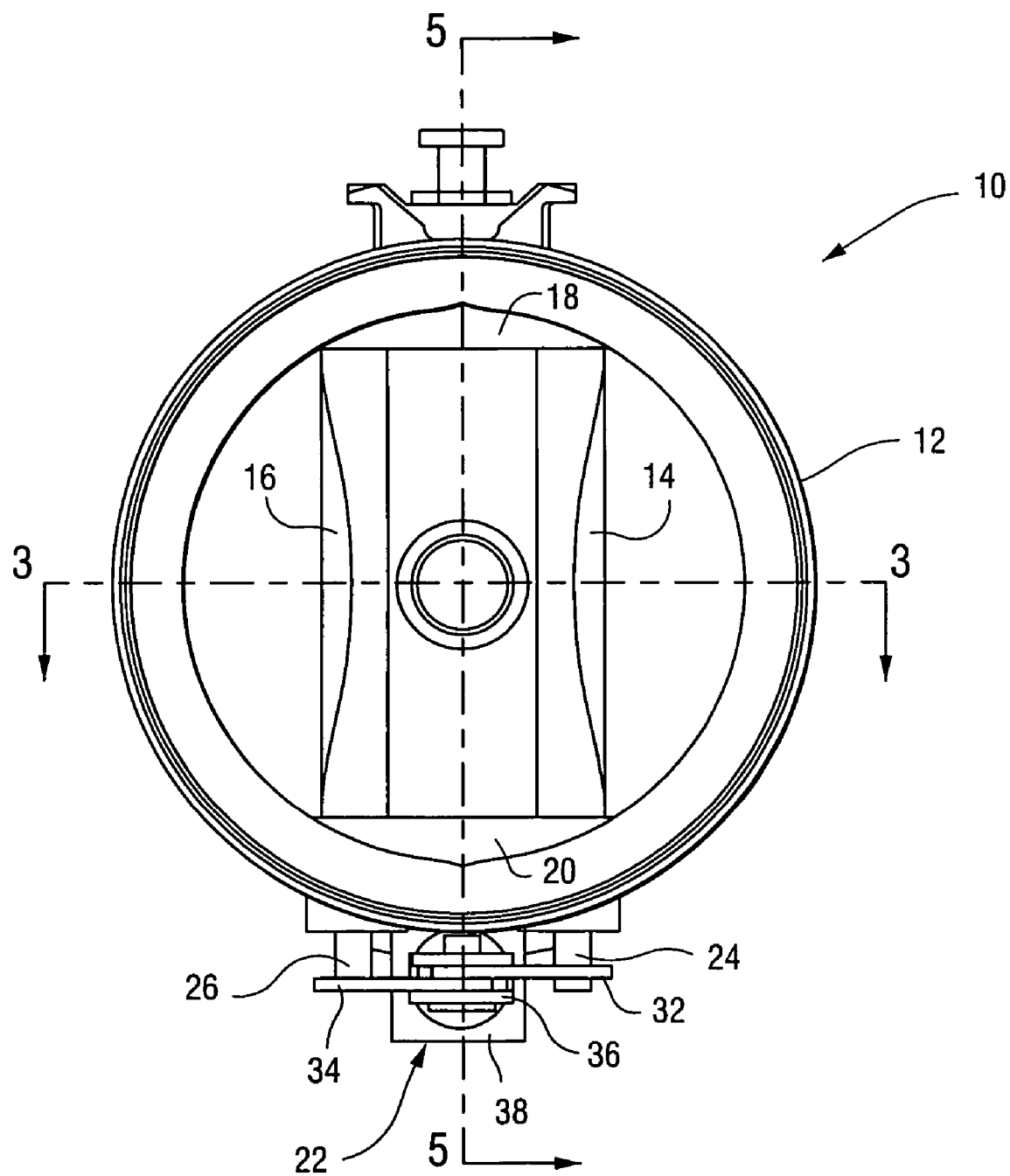
FIG. 2 is a rear elevational view of the nozzle assembly of the present invention.

FIGS. 2 and 5 disclose one example of an operating mechanism 22 that may be used for the pivotal movement of the vane members 14, 16. As shown in FIG. 2, link members 32, 34 are connected at their outer ends to the pivot pins 24, 26, respectively. At the inner ends thereof, the link members 32, 34 are operatively connected to one or more rod members 36 that are slidably mounted for longitudinal movement within a housing 38 disposed on and secured to the outer surface of the adjacent rocket or ramjet housing 30, as shown in FIG. 5. The longitudinal movement of the rod member or members 36, which may be affected mechanically, electromechanically, hydraulically, by squib actuation or in any other suitable manner, causes the movement of the link members 32, 34 and thus the rotation of the pivot pins 24, 26 connected to the vane members 14, 16 respectively. The vane members 14,16 may be moved simultaneously toward or away from the open or closed position for thrust control or, alternatively, one vane member may be moved independently of or a different distance than the other vane member for a thrust vector control.

The nozzle housing 12 and vane members 14, 16 may be formed of any suitable high temperature-resistant material. For example, the vane members 14, 16 may be formed of carbon-carbon, silicon carbide, tungsten or the like, or an insulated low temperature alloy such as carbon phenolic, silica phenolic or the like over a metal such as steel, titanium, nickel or the like.

As an illustrative example, if the nozzle housing 12 is of a length of approximately 12 inches and an inner diameter of approximately 6 inches, the vane members may be approximately 4.5 inches in height, approximately 8 inches in length, and approximately 0.7 inches in thickness at the widest point thereof.

The new and improved dual vane member construction of the nozzle assembly 10 provides for large throat area changes on the order of 20-1 and reduces the mass required to implement the system. The previously used thrust and thrust vector control constructions in nozzle assemblies allow for throat area changes only on the order of about 4-1 in ramjet applications and are relatively bulky and heavy. Accordingly, the nozzle assembly of the present invention is simple in construction, reliable in operation, relatively light in weight, and provides for throat area changes in rocket and ramjet applications that are significantly larger than prior art thrust and thrust vector controls in such nozzle assemblies.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A nozzle assembly for thrust or thrust vector control of a rocket or ramjet, comprising:
   an elongated nozzle housing having a forward end portion and a rear end portion spaced longitudinally from said forward end portion;
   a pair of vane members mounted on said nozzle housing for pivotal movement within the central portion of said nozzle housing, said vane members extending vertically or transversely between the upper and lower portions of said nozzle housing near said forward end portion thereof, said vane members extending longitudinally in said nozzle housing from said forward end portion thereof to a point near said rear end portion thereof;
   said vane members being pivotable about axes disposed between the forward and rear ends thereof, and being movable between an open position wherein they are in substantially parallel relation so that gases can flow between them and also between said vane members and said nozzle housing, and a closed position wherein their forward ends are in engagement with each other and their rear ends are in engagement with the adjacent inner surface of said nozzle housing; and
   an operating mechanism operatively connected to said vane members to move them simultaneously or individually between said open and closed positions for thrust control or thrust vector control.

2. The nozzle assembly of claim 1 wherein said nozzle housing is cylindrical with a curved inner surface, the forward end of each vane member is straight, and the rear end of each vane member is curved in a manner to engage in a uniform manner the adjacent curved inner surface of said nozzle housing when in said closed position.

3. The nozzle assembly of claim 1 wherein each of said vane members has a streamlined shape with a narrow forward end that tapers outwardly to a wider midportion and tapers inwardly to a narrow rear end so as to minimize the obstruction to gas flow through said nozzle housing when said vane members are in said open position.

4. The nozzle assembly of claim 1 wherein each of said vane members is connected to a pivot pin located at one of said axes, said pivot pin being operatively connected to said operating mechanism.

5. The nozzle assembly of claim 4 wherein said nozzle housing comprises substantially flat platforms on said upper and lower inner portions thereof, said pivot pins being rotatably connected to said platforms.

6. The nozzle assembly of claim 1 wherein said operating mechanism is disposed on the outer surface of said nozzle housing.

7. The nozzle assembly of claim 6 wherein said operating mechanism comprises a mechanical actuator, an electromechanical actuator, a hydraulic actuator, or a squib actuated mechanism.

8. The nozzle assembly of claim 1 wherein said nozzle housing and said vane members are formed of a high temperature-resistant material.

9. The nozzle assembly of claim 1 wherein said axes are located nearer said forward end portion of said nozzle housing than said rear end portion thereof.

10. The nozzle assembly of claim 1 wherein the pivotal movement of said vane members can effect throat area changes in said nozzle housing of approximately 20 to 1.

* * * * *